United States Patent
Schmitt et al.

(10) Patent No.: US 9,458,015 B2
(45) Date of Patent: Oct. 4, 2016

(54) METHOD FOR PREPARING ALKALI METAL SULPHIDE

(71) Applicant: Arkema France, Colombes (FR)

(72) Inventors: Paul Guillaume Schmitt, Lescar (FR); Georges Fremy, Sauveterre de Bearn (FR)

(73) Assignee: Arkema France, Colombes (FR)

( * ) Notice: Subject to any disclaimer, the term of this patent is extended or adjusted under 35 U.S.C. 154(b) by 12 days.

(21) Appl. No.: 14/439,925

(22) PCT Filed: Nov. 13, 2013

(86) PCT No.: PCT/FR2013/052725
§ 371 (c)(1),
(2) Date: Apr. 30, 2015

(87) PCT Pub. No.: WO2014/076416
PCT Pub. Date: May 22, 2014

(65) Prior Publication Data
US 2015/0246811 A1    Sep. 3, 2015

(30) Foreign Application Priority Data
Nov. 15, 2012 (FR) .................................. 12 60885

(51) Int. Cl.
*C01B 17/20* (2006.01)
*C01B 17/22* (2006.01)

(52) U.S. Cl.
CPC ..................... *C01B 17/22* (2013.01)

(58) Field of Classification Search
CPC ....... C01B 17/20; C01B 17/22; C01B 17/24; C01B 17/28; C01B 17/34
See application file for complete search history.

(56) References Cited

U.S. PATENT DOCUMENTS

| | | |
|---|---|---|
| 2,106,952 A | 2/1938 | Koenig |
| 4,126,666 A | 11/1978 | Jacob |
| 5,328,563 A | 7/1994 | Henricson |
| 5,659,086 A * | 8/1997 | Pauwels .............. C07C 319/24 568/25 |
| 6,187,960 B1 * | 2/2001 | Shaw ................... C07C 319/24 568/21 |
| 6,337,062 B1 | 1/2002 | Akiba |
| 2015/0246811 A1 * | 9/2015 | Schmitt .................. C01B 17/22 423/566.2 |

FOREIGN PATENT DOCUMENTS

| | | |
|---|---|---|
| DE | 10008161 | 8/2000 |
| EP | 0802159 | 10/1997 |
| FR | 2681883 | 4/1993 |
| JP | 2010163356 | 7/2010 |
| WO | 2010043885 | 4/2010 |

OTHER PUBLICATIONS

International Search Report for International Application No. PCT/FR2013/052725 mailed May 9, 2014.
Written Opinion of the International Searching Authority for International Application No. PCT/FR2013/052725 mailed May 9, 2014.

* cited by examiner

*Primary Examiner* — Timothy Vanoy
(74) *Attorney, Agent, or Firm* — RatnerPrestia

(57) ABSTRACT

The present invention concerns a method for preparing an alkali metal sulfide, from at least one oxygenated alkali metal compound comprising at least one step a) involving reacting said oxygenated alkali compound(s) with at least one sulfur compound of formula (I):

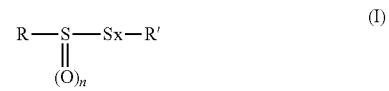

in which: R represents a linear or branched alkyl or alkenyl radical, containing 1 to 6 carbon atoms, preferably 1 to 4 carbon atoms; n is equal to 0, 1 or 2; x is equal to 0 or to a whole number having a value of between 1 and 10, preferably x is a whole number equal to 1, 2, 3 or 4; R' represents a linear or branched alkyl or alkenyl radical, containing 1 to 6 carbon atoms, preferably 1 to 4 carbon atoms or, only if n=x=0, a hydrogen atom; or indeed R and R' can form, together and with the sulfur atom(s) bearing them, a sulfur heterocycle containing 2 to 12 carbon atoms, preferably 2 to 8 carbon atoms, and optionally one or a plurality of heteroatoms chosen from oxygen, nitrogen and sulfur.

20 Claims, No Drawings

METHOD FOR PREPARING ALKALI METAL SULPHIDE

CROSS-REFERENCE TO RELATED APPLICATIONS

This application is a U.S. National Phase Application of International Application No. PCT/FR2013/052725, filed Nov. 13, 2013, which claims priority of French Application No. FR 12.60885, filed Nov. 15, 2012. The disclosures of each of these applications are incorporated herein by reference in their entirety for all purposes.

FIELD OF THE INVENTION

A subject matter of the invention is a process for the preparation of alkali metal sulfides from oxygen-comprising compounds of alkali metals and from sulfur-comprising organic compounds.

DISCUSSION OF THE RELATED ART

Alkali metal sulfides are present in many and different fields of application. For example, lithium sulfide can be used in lubricant formulations and also as component of electrolytes in energy storage systems, such as lithium-sulfur cells and batteries. In particular, lithium-sulfur batteries have an improved autonomy and a greater energy density than those of lithium-ion batteries and are thus promising candidates for new generations of energy storage systems, for example batteries.

Furthermore, rubidium sulfide is, for example, used in applications of semiconductor films for photovoltaic cells. Sodium sulfide is also used in multiple applications, such as, without implying limitation, in the textile, leather and paper industries.

Generally, alkali metal sulfides are produced by reaction between an alkali metal compound and hydrogen sulfide. Thus, the document JP 2010/163356 discloses a process for the production of lithium sulfide from lithium hydroxide in an organic medium in the presence of hydrogen sulfide.

The document WO 2010/043885 discloses a process for obtaining lithium alloy comprising transition metal sulfides by a solid-phase heat treatment of transition metal sulfide and of lithium-comprising compound in the presence of reducing agent, such as hydrogen sulfide.

The documents EP 0 802 159 and U.S. Pat. No. 4,126,666 disclose the production of lithium sulfide by a heat treatment of lithium hydroxide and of lithium carbonate respectively in the presence of hydrogen sulfide or of a mixture of hydrogen and gaseous sulfur.

All the documents of the prior art use hydrogen sulfide as sulfurization agent. However, hydrogen sulfide is a gas, in particular the storage, handling and post treatment of which require strict measures in terms of safety. This is because hydrogen sulfide is a highly toxic gas, its use on the industrial scale represents a serious risk and it would be preferable to limit its use.

There thus exists a major need to be able to have available a process for the industrial production of alkali metal sulfides which does not exhibit the disadvantages of the prior art.

SUMMARY OF THE INVENTION

Surprisingly, the applicant company has discovered, after various experiments and handling operations, that the use of certain sulfur-comprising organic compounds makes it possible to carry out the reaction for the production of alkali metal sulfides, in or not in the presence of catalyst, under conditions which can be easily achieved industrially, while not resorting to toxic, indeed even highly toxic, gaseous reactants, such as hydrogen sulfide.

According to a first aspect, the present invention thus relates to a process for the preparation of an alkali metal sulfide comprising at least one stage a) of reaction of at least one oxygen-comprising compound of said alkali metal with at least one sulfur-comprising compound of formula (I):

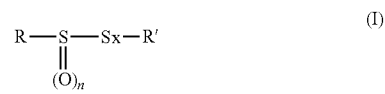

in which:
R represents a linear or branched alkyl or linear or branched alkenyl radical comprising from 1 to 6 carbon atoms, preferably from 1 to 4 carbon atoms, limits included;
n is equal to 0, 1 or 2;
x is equal to 0 or to an integer taking the values from 1 to 10, limits included; preferably, x is an integer equal to 1, 2, 3 or 4;
R' represents a linear or branched alkyl or linear or branched alkenyl radical comprising from 1 to 6 carbon atoms, limits included, preferably from 1 to 4 carbon atoms, or, only if n=x=0, a hydrogen atom;
or else R and R' can together form, and with the sulfur atom(s) which carry(ies) them, a sulfur-comprising heterocycle comprising from 2 to 12 carbon atoms, preferably from 2 to 8 carbon atoms, limits included, and optionally, in addition to the sulfur atom(s) indicated in the formula (I), one or more heteroatoms chosen from oxygen, nitrogen and sulfur.

DETAILED DESCRIPTION OF THE INVENTION

Mention may be made, among the abovementioned sulfur-comprising heterocycles, as nonlimiting examples, of thiophene, thiolane, dithiolane, thiazole, thiazine, thiepane, dithiepane, oxathiane and others, to mention only the commonest of them, but also the sulfur-comprising cyclic derivatives of terpenes, such as, for example, the addition products of sulfur to terpenes, in particular to myrcene, which are mono-, di-, tri- or tetrathioperillenes.

The compounds of formula (I) which can be used in the context of the process of the present invention exhibit numerous advantages, among which may be mentioned, without implied limitation, of not being gaseous at ambient temperature and generally being liquid at ambient temperature, and also of being much less toxic than hydrogen sulfide, indeed even of being only slightly toxic or nontoxic. Contrary to the handling of toxic and gaseous hydrogen sulfide, the use of the compounds of formula (I) in the liquid or solid form thus makes it possible to facilitate in particular the handling procedures and also the general way in which the process for the synthesis of the alkali metal sulfides is carried out.

Among the compounds of formula (I), preference is given to the compounds of formula (I) for which n and x do not simultaneously represent the value 0. According to another preferred embodiment, preference is given to those for which n represents 1 and, among these, preference is given to those for which x represents 0 and, in this case, the compounds of formula (I) are sulfoxides, a particularly preferred representative of which is dimethyl sulfoxide (DMSO).

According to another embodiment, preference is given to the compounds of formula (I) for which n represents 2 and, among these, preference is given to those for which x represents 0 and, in this case, the compounds of formula (I) are sulfones, a representative of which particularly suited to the process of the present invention is tetramethylene sulfone or dimethyl sulfone.

According to a very particularly preferred embodiment, the compound(s) of formula (I) employed in the process of the present invention are the compounds of formula (I) for which n represents 0, that is to say sulfides, disulfides or polysulfides, according to whether x represents 0 or 1 or an integer strictly greater than 1 respectively.

According to an advantageous embodiment of the present invention, the sulfur-comprising compound of formula (I) is such that n is equal to 0 and x=1, 2, 3 or 4, preferably x=1, 2 or 3, preferably x=1 or 2 and entirely preferably x=1. According to yet another embodiment, the compound of formula (I) can be a mixture of compounds of formula (I) for which, on average, x is between 2 and 10 (limits included), preferably with a mean value of x of between 3 and 5 (limits included).

In one embodiment, the sulfur-comprising compound of formula (I) is such that R and R' each represent a linear or branched alkyl radical comprising from 1 to 6 carbon atoms, preferably from 1 to 4 carbon atoms, for example methyl, ethyl, propyl (n-propyl or isopropyl), butyl (n-butyl, isobutyl or tert-butyl), pentyls and hexyls. In addition, preference is given to the compounds of formula (I) in which the R and R' radicals are identical.

Preferably, the sulfur-comprising compound is chosen from dimethyl sulfide, diethyl sulfide, di(n-propyl) sulfides, diisopropyl sulfide, di(n-butyl) sulfide, diisobutyl sulfide or di(tert-butyl) sulfide. According to yet another preference, the sulfur-comprising compound is chosen from dimethyl disulfide, diethyl disulfide, di(n-propyl) disulfide, diisopropyl disulfide, di(n-butyl) disulfide, diisobutyl disulfide, di(tert-butyl) disulfide, dimethyl trisulfide, diethyl trisulfide, di(n-propyl) trisulfide, diisopropyl trisulfide, di(n-butyl) trisulfide, diisobutyl trisulfide, di(tert-butyl) trisulfide, dimethyl tetrasulfide, diethyl tetrasulfide, di(n-propyl) tetrasulfide, diisopropyl tetrasulfide, di(n-butyl) tetrasulfide, diisobutyl tetrasulfide, di(tert-butyl) tetrasulfide and their mixtures, preferably dimethyl disulfide, diethyl trisulfide and dimethyl tetrasulfide, and also mixtures of symmetrical or asymmetrical (R and R' respectively identical or different) dialkyl polysulfides (n=0 and 1≤x≤10), such as, for example, the mixtures known under the acronym DSO (DiSulfide Oils).

The compounds indicated above can, of course, be used alone or as mixtures, for example as mixtures of two or more of the sulfur-comprising compounds listed above in all proportions.

In a preferred embodiment of the invention, the sulfur-comprising compound is chosen from dimethyl disulfide (DMDS), diethyl disulfide (DEDS) and their mixtures.

The sulfur-comprising compounds of formula (I) are known and are commercially available or are easily prepared from procedures known from the patent literature, from the scientific literature, from Chemical Abstracts or from the Internet.

In the process according to the present invention, the sulfur-comprising compound(s) as just defined above is (are) brought into contact with at least one oxygen-comprising alkali metal compound. In the present description, "oxygen-comprising alkali metal compound" is understood to mean a compound comprising at least one alkali metal atom and at least one oxygen atom.

Preferably, the oxygen-comprising alkali metal compound is chosen from the oxides, hydroxides, hydrogencarbonates, carbonates, sulfates, sulfides, nitrates, nitrites and carboxylates (for example oxalates, formates, acetates, lactates, citrates and others) of said alkali metal and the mixtures of two or more of them, in all proportions.

"Alkali metal" is understood to mean the alkali metals of Group 1 of the Periodic Table of the Elements and more particularly the alkali metals chosen from lithium, sodium, potassium, rubidium, cesium and their mixtures; preferably, the alkali metal is lithium, sodium or potassium; entirely preferably, the alkali metal is lithium.

As regards the oxygen-comprising lithium compounds, preference is given to those chosen from lithium oxide ($Li_2O$), lithium hydroxide (LiOH), lithium carbonate ($Li_2CO_3$), lithium hydrogencarbonate ($LiHCO_3$), lithium sulfate ($Li_2SO_4$), lithium nitrate ($LiNO_3$) and lithium oxalate ($Li_2C_2O_4$).

As regards the oxygen-comprising sodium compounds, preference is given to those chosen from sodium oxide ($Na_2O$), sodium hydroxide (NaOH), sodium carbonate ($Na_2CO_3$), sodium hydrogencarbonate ($NaHCO_3$), sodium sulfate ($Na_2SO_4$), sodium nitrate ($NaNO_3$) and sodium oxalate ($Na_2C_2O_4$).

As regards the oxygen-comprising potassium compounds, preference is given to those chosen from potassium oxide ($K_2O$), potassium hydroxide (KOH), potassium carbonate ($K_2CO_3$), potassium hydrogencarbonate ($KHCO_3$), potassium sulfate ($K_2SO_4$), potassium nitrate ($KNO_3$) and potassium oxalate ($K_2C_2O_4$).

As regards the oxygen-comprising rubidium compounds, preference is given to those chosen from rubidium oxides ($Rb_2O$, $Rb_2O_2$, $Rb_2O_3$, $RbO_2$), rubidium hydroxide (RbOH), rubidium carbonate ($Rb_2CO_3$), rubidium hydrogencarbonate ($RbHCO_3$), rubidium sulfate ($Rb_2SO_4$), rubidium nitrate ($RbNO_3$) and rubidium oxalate ($Rb_2C_2O_4$).

As regards the oxygen-comprising cesium compounds, preference is given to those chosen from cesium oxide ($Cs_2O$), cesium hydroxide (CsOH), cesium carbonate ($Cs_2CO_3$), cesium hydrogencarbonate ($CsHCO_3$), cesium sulfate ($Cs_2SO_4$), cesium nitrate ($CsNO_3$) and cesium oxalate ($Cs_2C_2O_4$).

The oxygen-comprising compounds of alkali metals as just described above are known and are available commercially or are easily prepared from procedures known from the patent literature, from the scientific literature, from Chemical Abstracts or from the Internet.

The process according to the present invention is very particularly suitable for the preparation of lithium sulfide ($Li_2S$) from dimethyl disulfide (DMDS) and lithium hydroxide or lithium carbonate or lithium oxide, preferably from DMDS and lithium oxide and/or lithium hydroxide.

According to the process of the present invention, the "sulfur-comprising compound(s)/oxygen-comprising alkali metal compound(s)" molar ratio is chosen such that the sulfur/alkali metal molar ratio is generally between 0.5 and 10, preferably between 0.5 and 5, limits included. The implementation of the process of the invention with said molar ratio of less than 0.5 would not result in a complete sulfurization of the alkali metal(s). A molar ratio of greater than 10 would not contravene the implementation of the process of the invention but would be regarded as nonprofitable since a large portion of the compound(s) of formula (I) would not be used for the sulfurization of the alkali metal.

The process according to the present invention is characterized in that it comprises at least one stage a) of reaction of at least one compound of formula (I) as defined above with at least one oxygen-comprising alkali metal compound as defined above.

According to an alternative form of the process of the invention, stage a) also comprises the addition of an amount of hydrogen in a $H_2$/sulfur atom originating from the sulfur-comprising compound of formula (I) molar ratio of between 0.01 and 10, preferably between 0.01 and 1.

Preferably, stage a) of the process of the invention is carried out at a temperature of between 150° C. and 1500° C., more preferably between 150° C. and 800° C.

According to one embodiment of the process of the invention, stage a) is carried out at a temperature of between 150° C. and 400° C., preferably of between 200° C. and 350° C.

In this first temperature range, stage a) is advantageously carried out in the presence of at least one catalyst which has in particular the aim of increasing the kinetics of the reaction.

In this case, the catalyst can be of any type known to a person skilled in the art and preferably chosen from cobalt oxides, nickel oxides, molybdenum oxides and their mixtures, which are or are not supported, for example on silica, alumina or active charcoal. For example, the catalyst can be chosen from the commercial catalysts from Axens, such as HR626, HR526, HR548 or HR648.

According to another embodiment of the invention, stage a) is carried out a temperature preferably of between 300° C. and 800° C., more preferably still between 300° C. and 600° C. In this second temperature range, the reaction can be carried out without catalyst and is preferably carried out in the absence of catalyst. However, stage a) can be carried out in the presence of at least one catalyst, such as those defined above, in this temperature range of 300 and 600° C.

The reaction between at least one compound of formula (I) and at least one oxygen-comprising alkali metal compound can be carried out in a solvent medium or in the absence of solvent; however, it is preferable to carry out the reaction in the absence of solvent in order to avoid possible treatments and/or recyclings of the solvent(s) used.

Stage a) of the process according to the invention can be carried out under pressure, under reduced pressure or also at atmospheric pressure, depending on the temperature chosen, the nature of the reactants, the nature of the final product desired and the presence of the optional solvent and of the optional catalyst. Generally, stage a) is preferably carried out at atmospheric pressure, for obvious reasons of simplicity and of the overall cost of implementing the process of the invention.

Stage a) of the process of the present invention can be carried out in any type of suitable reactor, with stirring or without stirring, or else in a reaction column, the latter embodiment being particularly preferred. At least one sulfur-comprising compound of formula (I), preheated or not preheated, is injected, in the liquid form, continuously or batchwise, directly or via a vaporizer if the compound of formula (I) is in the gas form, onto at least one oxygen-comprising alkali metal compound, generally in the solid form, preheated or not, in the optional presence of one or more solvent(s), optionally in the presence of hydrogen and in the optional presence of one or more catalysts, as indicated above.

The reaction is carried out at the chosen temperature and at the chosen pressure for a period of time sufficient to obtain the desired degree of sulfurization of said oxygen-comprising alkali metal compound, generally for a period of time of between a few seconds and a few hours.

In one embodiment of the invention, stage a) also comprises the addition of an amount of water such that the $H_2O$/sulfur atom originating from the sulfur-comprising compound of formula (I) molar ratio (that is to say, moles of $H_2O$/moles of S ratio) is advantageously between 0.01 and 10, preferably between 0.01 and 1. In an alternative form, the water can be completely or partially replaced with hydrogen, in the same proportions as those indicated above.

The water and/or the hydrogen can be added all at once or on several occasions, continuously or noncontinuously. In a preferred embodiment, water is added during stage a) of the process according to the present invention.

According to an alternative form of the process of the invention, sulfur can be contributed to or introduced into the reaction medium. The sulfur can originate from the sulfur-comprising compound itself or also be added (injected) directly in the liquid or solid form to (into) the reaction medium.

When sulfur is directly injected in the liquid form into the reaction medium, it is thus possible to envisage carrying out the process of the invention by using DMDS and liquid sulfur ($S_8$). In an alternative form, the sulfur can be introduced in the solid form, for example as an intimate mixture of solid sulfur with the oxygen-comprising alkali metal compound, the sulfide of which it is desired to prepare.

It should also be understood that the process of sulfurization of at least one oxygen-comprising alkali metal compound according to the present invention can be carried out in the presence of carbon disulfide ($CS_2$) and/or of hydrogen sulfide ($H_2S$), although this does not constitute a preferred embodiment, in particular for the reasons mentioned above of toxicity and of dangerousness of these compounds.

In one embodiment of the invention, stage a) is followed by a stage b) of recovery of the alkali metal sulfide prepared in the reactor or the column used in stage a) and optionally by a stage c) of purification of the alkali metal sulfide obtained, according to any method known to a person skilled in the art, for example by washing, recrystallization and others.

According to another aspect, the present invention relates to the use of at least one compound of formula (I) as defined above in the preparation of alkali metal sulfides of formula $M_2S$, in which M represents an atom of an alkali metal preferably chosen from lithium, sodium, potassium, rubidium and cesium, and in particular to the use of dimethyl disulfide in the preparation of lithium sulfide.

As indicated above, alkali metal sulfides, such as those obtained according to the process of the present invention, have applications in a great many fields, such as, for example, semiconductor films for photovoltaic cells in the case of rubidium sulfide, in the textile, leather and paper industries for sodium sulfide, or also as component of lubricant formulations or component of electrolytes or of electrodes in energy storage systems, in the case of lithium sulfide.

Lithium sulfide is in particular entirely suitable as component in energy storage systems, such as lithium-sulfur cells and batteries, which exhibit an improved autonomy and a greater energy density than those of lithium-ion batteries.

This is because lithium-ion batteries can exhibit certain safety problems due to the use of a negative electrode made of lithium metal. The use of such a negative electrode and the safety problems which are inherent in it can be solved by virtue of the use of a positive electrode based on lithium sulfide.

This is because this alternative makes it possible to produce Li-ion/S storage batteries, in that the use of an Li$_2$S positive electrode contributes the lithium source and can then be combined with a negative electrode material other than lithium, such as, for example, graphite (C), silicon (Si), tin (Sn), and the like.

The following examples illustrate the invention without limiting in any way the scope of protection applied for as it appears in the appended claims.

Example 1

Powdered lithium oxide (Li$_2$O) with a particle size of 150 μm and with a purity of 99.5% from Alfa Aesar is milled so as to recover a particle size of approximately 10 μm. 10 g of this lithium oxide powder are withdrawn and are deposited in a silicate crucible.

A tube made of Hastelloy with a diameter of 3 cm and a length of 50 cm was especially designed in order to place and maintain a perforated screen at 30 cm from one edge of the tube (and thus 20 cm from the other edge). The 30 cm portion of the tube is referred to as part A and the 20 cm portion of the tube as part B in order to understand this example. The two ends of the tube are intended to accept perforated screens before connecting this tube to a gas supply network.

The silicate crucible containing the 10 g of lithium oxide is set down at the center of part B of the tube. The tube is inserted into a pyrolysis oven in order to be able to drop in temperature.

The ends of the tube are connected to gas supply networks which make it possible to supply the tube with gas in the direction from part A to part B, after having taken the precaution of positioning the perforated screens at the 2 ends of the tube. A stage of dehydration of the lithium oxide is undertaken by carrying out flushing under nitrogen at 250° C. for 10 minutes. The nitrogen flow rate is 50 Sl/h. At the end of this stage, the temperature is increased to 550° C., still under a nitrogen flow.

Subsequently, dimethyl disulfide (DMDS), supplied by Arkema, with a purity of 99.5%, is injected into the tube. A flow rate of 60 g/h of DMDS in 60 Sl/h of nitrogen is injected into the tube in order to sulfurize the lithium oxide powder to give lithium sulfide. The reaction time is maintained for 2 hours. At the end of the sulfurization, the reactor is cooled under nitrogen with a flow rate of 50 Sl/h.

X-ray fluorescence analysis of the final powder obtained reveals an acceptable degree of sulfurization corresponding to a molar degree of conversion of Li$_2$O to give Li$_2$S of greater than 95% of Li$_2$S formed. However, a few traces of carbon-comprising compounds are observed by elemental analysis.

Example 2

Example 1 is repeated but, for this example, the sulfurization reaction is carried out with a flow rate of 60 g/h of DMDS in 60 Sl/h of hydrogen (instead of nitrogen). The DMDS/H$_2$ mixture is injected into the tube in order to sulfurize the lithium oxide powder to give lithium sulfide. The reaction time is maintained for 2 hours. At the end of the sulfurization, the reactor is cooled under nitrogen with a flow rate of 50 Sl/h.

X-ray fluorescence analysis of the final powder obtained reveals a complete molar degree of conversion of Li$_2$O to give Li$_2$S of 100%.

Example 3

Example 2 is repeated but, for this example, a cobalt/molybdenum catalyst supported on alumina, HR626 from Axens, is positioned throughout the whole of compartment A of the Hastelloy tube. A total amount of approximately 210 ml of catalyst is thus positioned between the two perforated screens separating parts A and B and the other at the end of the tube.

Instead of lithium oxide, as in example 2, lithium hydroxide (LiOH) powder with a purity of 99.995% is supplied by Alfa Aesar. This LiOH is milled in order to recover a particle size of approximately 10 μm. 10 g of this lithium hydroxide powder are withdrawn and are deposited in a silicate crucible. The silicate crucible containing 10 g of lithium hydroxide is set down at the center of part B of the tube.

The tube is inserted into a pyrolysis oven in order to be able to go up in temperature. The ends of the tube are connected to gas supply networks which make it possible to supply the tube with gas in the direction from part A to part B, after having taken the precaution of positioning the perforated screens at the 2 ends of the tube. A stage of dehydration of the lithium hydroxide is undertaken by carrying out a flushing with nitrogen at 250° C. for 1 hour. The nitrogen flow rate is 50 Sl/h.

At the end of this stage, the temperature is increased to 350° C., still under a nitrogen flow. Subsequently, a flow rate of 40 g/h of DMDS in 40 Sl/h of hydrogen is injected into the tube in order to sulfurize the lithium hydroxide powder to give lithium sulfide. The reaction time is 30 minutes. At the end of the sulfurization, the reactor is cooled under nitrogen with a flow rate of 50 Sl/h.

X-ray fluorescence analysis of the final powder obtained reveals a complete molar degree of conversion of 2LiOH to give Li$_2$S of 100%, this being the case despite a sulfurization temperature of 350° C.

The invention claimed is:

1. A process for the preparation of an alkali metal sulfide from at least one oxygen-comprising alkali metal compound, comprising at least one stage a) involving reacting said oxygen-comprising alkali metal compound(s) with at least one sulfur-comprising compound of formula (I):

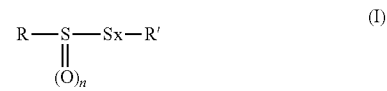

in which:
R represents a linear or branched alkyl or linear or branched alkenyl radical comprising from 1 to 6 carbon atoms, limits included;
n is equal to 0, 1 or 2;
x is equal to 0 or to an integer taking the values from 1 to 10, limits included;
R' represents a linear or branched alkyl or linear or branched alkenyl radical comprising from 1 to 6 carbon atoms, limits included, or, only if n=x=0, a hydrogen atom;
or else R and R' can together form, and with the sulfur atom(s) which carry(ies) them, a sulfur-comprising heterocycle comprising from 2 to 12 carbon atoms, limits included, and optionally, in addition to the sulfur atom(s) indicated in the formula (I), one or more heteroatoms chosen from oxygen, nitrogen and sulfur.

2. The process as claimed in claim 1, wherein said oxygen-comprising alkali metal compound is selected from the group consisting of the oxides, hydroxides, hydrogencarbonates, carbonates, sulfates, sulfites, nitrates, nitrites and carboxylates of said alkali metal and also the mixtures of two or more of them, in all proportions.

3. The process as claimed in claim 1, wherein the alkali metal is selected from the group consisting of lithium, sodium, potassium, rubidium, cesium and their mixtures.

4. The process as claimed in claim 1, wherein said sulfur-comprising compound of formula (I) is such that n=0.

5. The process as claimed in claim 1, wherein said sulfur-comprising compound of formula (I) is such that x=1, 2 or 3 or is a mixture of sulfur-comprising compounds with, on average, x between 2 and 10 (limits included).

6. The process as claimed in claim 1, wherein the sulfur-comprising compound is selected from the group consisting of dimethyl trisulfide, diethyl trisulfide, dimethyl tetrasulfide, diethyl tetrasulfide, dimethyl disulfide, diethyl disulfide, di(n-propyl) disulfide, diisopropyl disulfide and their mixtures, preferably dimethyl disulfide, diethyl trisulfide and dimethyl tetrasulfide, and their mixtures.

7. The process as claimed in claim 1, wherein stage a) is carried out at a temperature of between 150° C. and 1500° C.

8. The process as claimed in claim 1, wherein stage a) is carried out in the presence of at least one catalyst selected from the group consisting of cobalt oxides, nickel oxides, molybdenum oxides and their mixtures, which are or are not supported, at a temperature of between 150 and 400° C.

9. The process as claimed in claim 1, wherein stage a) is carried out in the absence of catalyst at a temperature of between 300 and 600° C.

10. The process as claimed in claim 1, wherein lithium sulfide ($Li_2S$) is prepared from dimethyl disulfide (DMDS) and lithium hydroxide or lithium carbonate or lithium oxide.

11. The process as claimed in claim 1, wherein the alkali metal sulfide has formula $M_2S$, where M represents an alkali metal selected from the group consisting of lithium, potassium, sodium, rubidium and cesium.

12. The process as claimed in claim 1, wherein the compound of formula (I) is dimethyl disulfide and the alkali metal sulfide is lithium sulfide.

13. The process as claimed in claim 1, wherein the sulfur-comprising compound(s) and oxygen-comprising alkali metal compounds are present in amounts to provide a sulfur/alkali metal molar ratio of between 0.5 and 10.

14. The process as claimed in claim 1, wherein stage a) is carried out at a temperature of between 300° C. and 800° C.

15. The process as claimed in claim 1, wherein stage a) is carried out at a temperature of between 300° C. and 600° C.

16. The process as claimed in claim 1, wherein x is an integer equal to 1, 2, 3 or 4.

17. The process as claimed in claim 1, wherein R represents a linear or branched alkyl or linear or branched alkenyl radical comprising from 1 to 4 carbon atoms, limits included.

18. The process as claimed in claim 1, wherein R' represents a linear or branched alkyl or linear or branched alkenyl radical comprising from 1 to 4 carbon atoms, limits included, or, only if n=x=0, a hydrogen atom.

19. The process as claimed in claim 1, wherein stage a) is carried out in the presence of at least one of hydrogen or water.

20. The process as claimed in claim 1, wherein stage a) is carried out in the presence of sulfur.

* * * * *